United States Patent
Masaki

(10) Patent No.: US 9,381,933 B2
(45) Date of Patent: Jul. 5, 2016

(54) MANUALLY PROPELLED VEHICLE

(71) Applicant: Funai Electric Co., Ltd., Osaka (JP)

(72) Inventor: Yasuo Masaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/286,656

(22) Filed: May 23, 2014

(65) Prior Publication Data

US 2014/0365033 A1    Dec. 11, 2014

(30) Foreign Application Priority Data

Jun. 7, 2013   (JP) .................. 2013-120698

(51) Int. Cl.
*B62B 5/00*   (2006.01)
*A61H 3/04*   (2006.01)
*A61G 5/04*   (2013.01)

(52) U.S. Cl.
CPC ............. *B62B 5/0076* (2013.01); *A61H 3/04* (2013.01); *A61G 5/04* (2013.01); *A61G 2005/048* (2013.01); *A61H 2003/043* (2013.01); *A61H 2003/046* (2013.01); *A61H 2201/5007* (2013.01); *A61H 2201/5028* (2013.01); *A61H 2201/5061* (2013.01); *A61H 2201/5069* (2013.01); *A61H 2201/5084* (2013.01); *A61H 2201/5092* (2013.01); *A61H 2201/5097* (2013.01)

(58) Field of Classification Search
CPC ............ A61H 3/04; A61H 2201/5069; A61H 2003/043; A61H 2201/0176; A61H 2201/1635; A61H 2201/168; A61H 2201/5028; A61H 2201/5064; A61H 2201/5061; A61H 2003/002
USPC ............. 701/22, 2; 180/167, 6.66, 19.1, 65.6; 280/250.1, 47.34, 200, 242.1, 87.051
See application file for complete search history.

(56) References Cited

U.S. PATENT DOCUMENTS

| | | | | |
|---|---|---|---|---|
| 8,666,466 | B2 * | 3/2014 | Kuhn .................. | A61B 5/0084 600/323 |
| 2011/0166753 | A1 * | 7/2011 | Yu ............................ | A61H 3/04 701/51 |
| 2011/0190593 | A1 * | 8/2011 | McNair .................. | A61B 5/00 600/300 |

FOREIGN PATENT DOCUMENTS

| | | | |
|---|---|---|---|
| DE | 202012011634 | * | 4/2013 |
| JP | 4665173 B2 | | 4/2011 |
| JP | 4665173 B2 | * | 4/2011 |

* cited by examiner

*Primary Examiner* — Marthe Marc-Coleman
(74) *Attorney, Agent, or Firm* — Osha Liang LLP

(57) ABSTRACT

A manually propelled vehicle includes a main body part comprising a wheel and a motor that drives the wheel when a user pushes the main body part in an advancing direction, and a mounting unit to be carried by the user and that communicates with the main body part. The mounting unit comprises a first motion sensor comprising an acceleration sensor in three orthogonal directions, and the main body part controls a drive of the motor based on a detection result of the first motion sensor.

17 Claims, 8 Drawing Sheets

MANUALLY PROPELLED VEHICLE

TECHNICAL FIELD

The present invention relates generally to a manually propelled vehicle where a rotation of a wheel is controlled by a motor.

BACKGROUND ART

Patent Document 1 discloses a manually propelled vehicle where a rotation of a wheel is controlled. This manually propelled vehicle has a foot position sensor, an upper body sensor, a memory, and a controller, and when it is pushed by a user in the advancing direction, the wheels are rotated to move. The foot position sensor is composed of a laser range finder, and measures a distance between a foot of the user pushing the manually propelled vehicle and the manually propelled vehicle. The upper body sensor is composed of a laser range finder, and detects a position of the upper body of the user with respect to the manually propelled vehicle.

The memory stores a database where a condition of the user is associated in advance with the foot position and the upper body position. The controller determines the condition of the user based on a detection result of the foot position sensor and upper body sensor as well as the database, and controls the rotation of the wheel. Specifically, when the user is stopped, the rotation of the wheel is locked by applying a brake. Accordingly, the movement of the manually propelled vehicle can be controlled based on the condition of the user.

RELATED ART DOCUMENTS

Patent Document

[Patent Document 1] Japanese Unexamined Patent Application Publication No. 4665173 (Pages 8 to 10, FIGS. 2, 11, and 12)

However, with the manually propelled vehicle of Patent Document 1 described above, the foot position sensor and the upper body sensor are composed of an expensive laser range finder. Therefore, the manufacturing cost of the manually propelled vehicle is increased.

SUMMARY OF THE INVENTION

One or more embodiments of the present invention provide a manually propelled vehicle that can improve usability and reduce manufacturing cost.

According to one or more embodiments, a manually propelled vehicle may comprise: a main body part comprising a wheel and a motor that drives the wheel when a user pushes the main body part in an advancing direction; and a mounting unit to be carried by the user and that communicates with the main body part, wherein the mounting unit comprises a first motion sensor comprising an acceleration sensor in three orthogonal directions, and the main body part controls a drive of the motor based on a detection result of the first motion sensor. In another aspect, according to one or more embodiments, a method for controlling the manually propelled vehicle may comprise: detecting a moving condition of the mounting unit using a first motion sensor; controlling a drive of a motor of the main body part based on a detection result of the first motion sensor; and driving a wheel of the main body part with the motor when the first motion sensor detects a horizontal movement of the mounting unit, and stopping the wheel when the first motion sensor detects falling or stopping of the horizontal movement of the mounting unit.

According to one or more embodiments, when the user pushes the main body part in the advancing direction, a rotation of the wheel may be assisted by the motor. The mounting unit may comprise a first motion sensor comprising an acceleration sensor in three orthogonal directions, and may be worn by the user to carry out communication with the main body part. A horizontal movement and vertical movement of the mounting unit may be detected by the first motion sensor. A drive of the motor may be controlled based on a detection result of the first motion sensor sent to the main body part.

According to one or more embodiments, the motor may drive the wheel when the first motion sensor detects a horizontal movement of the mounting unit, and the motor stops the wheel when the first motion sensor detects falling or stopping of the horizontal movement of the mounting unit.

According to one or more embodiments, the main body part may further comprise a second motion sensor that detects a moving condition of the main body part and controls a drive of the motor based on correction data that corrects detection data of the first motion sensor by comparing detection results between the first motion sensor and the second motion sensor.

According to one or more embodiments, comparing the detection result of the first motion sensor and the detection result of the second motion sensor may allow the detection data of the first motion sensor to be corrected. Then, a drive of the motor may be controlled based on the corrected detection data of the first motion sensor.

According to one or more embodiments, the first motion sensor may further comprise a gyro sensor that detects rotation direction in at least three orthogonal planes. According to the configuration, for example, a tilt in the vertical plane and a rotation in the horizontal plane of the mounting unit may be detected by the gyro sensor.

According to one or more embodiments, the motor stops the wheel regardless of a condition of a horizontal movement of the mounting unit when the gyro sensor detects a tilt in a vertical plane of the mounting unit.

According to one or more embodiments, the main body part may further comprise: a grip part to be gripped by the user; and a grip part sensor that detects force applied to the grip part and controls a drive of the motor based on a detection result of the first motion sensor and the grip part sensor. By this configuration, for example, the force applied to the grip part may be detected by the grip part sensor, and the drive of the motor may be controlled based on detection results of the first motion sensor and the grip part sensor.

According to one or more embodiments, the grip part sensor may detect weight in a horizontal direction and weight in a vertical direction on the grip part.

According to one or more embodiments, the motor may drive the wheel when the grip part sensor detects a weight in the horizontal direction while the wheel is stopped, and the motor may stop the wheel regardless of a condition of a horizontal movement of the mounting unit when the grip part sensor detects a downward weight.

According to one or more embodiments, the main body part may store identification information of the mounting unit and the correction data for each of the identification information.

According to one or more embodiments, the mounting unit may be a portable information terminal. According to this configuration, for example, a horizontal movement, vertical movement, rotation in the horizontal plane, tilt in the vertical plane, and the like of a portable information terminal carried by a user may be detected by the acceleration sensor and gyro sensor provided in the portable information terminal.

According to one or more embodiments, the main body part may store identification information of the mounting unit and the correction data for each of the identification information. According to this configuration, for example, the mounting unit stores the detection data of the first motion sensor when the user has walked away from the main body part, and the detection data of the first motion sensor stored in the mounting unit may be sent to the main body part at the time of operation of the main body part.

According to one or more embodiments, of another aspect of the present invention, a manually propelled vehicle may comprise: a main body part comprising a wheel and a motor that drives the wheel when a user pushes the main body part in an advancing direction a wheel, wherein the manually propelled vehicle acquires detection data from an acceleration sensor of a portable information terminal in three orthogonal directions and controls the motor based on the detection data.

According to one or more embodiments, when the user pushes in the advancing direction, the rotation of the wheel may be assisted by the motor. Movement of the user carrying a portable information terminal having an acceleration sensor in three orthogonal directions may be detected by the acceleration sensor. The detected data of the acceleration sensor may be sent to the manually propelled vehicle from the portable information terminal, and a drive of the motor may be controlled based on the detection data.

According to one or more embodiments, a mounting unit worn on a user to communicate with the main body part may comprise a first motion sensor comprising an acceleration sensor in three orthogonal directions, and may control a drive of the motor of the main body part based on a detection result of the first motion sensor. For example, because the sensor for detecting a condition of the user is placed on the user rather than placing away from the user, an acceleration sensor moderate in price can be used. Accordingly, even when using a moderately price acceleration sensor, the drive of the motor can be controlled based on the condition of the user pushing the manually propelled vehicle. Therefore, while improving usability of the manually propelled vehicle, manufacturing cost of the manually propelled vehicle can be reduced.

According to one or more embodiments, a manually propelled vehicle may acquire detection data of an acceleration sensor from a portable information terminal comprising an acceleration sensor in three orthogonal directions, and control a drive of the motor based on the detection data. For example, because the user carries the sensor for detecting a condition of the user rather than placing the sensor away from the user, an acceleration sensor moderate in price can be used. Accordingly, even when using a moderately priced acceleration sensor, the drive of the motor can be controlled based on the condition of the user pushing the manually propelled vehicle. Therefore, while improving the usability of the manually propelled vehicle, the manufacturing cost of the manually propelled vehicle can be reduced.

DETAILED DESCRIPTION OF EMBODIMENTS

FIRST EXAMPLE

Figure 1:
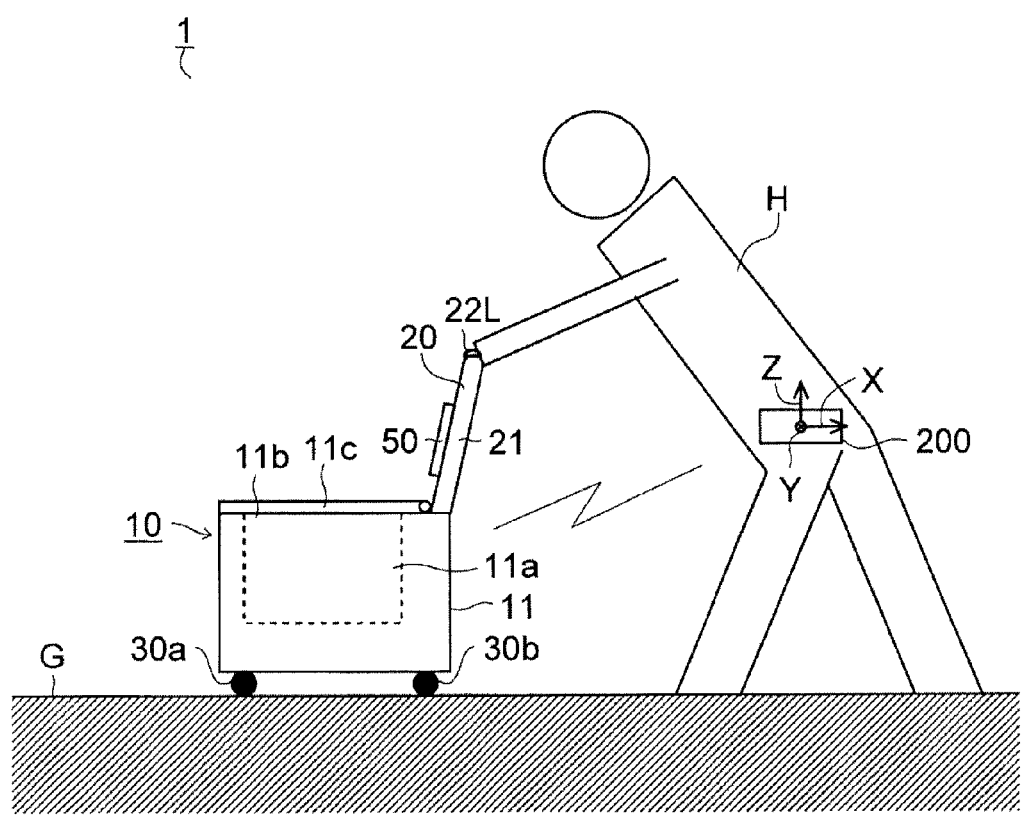
FIG. 1 is a side view illustrating an ambulatory assist vehicle according to one or more embodiments of a first example of the present invention.
Figure 2:
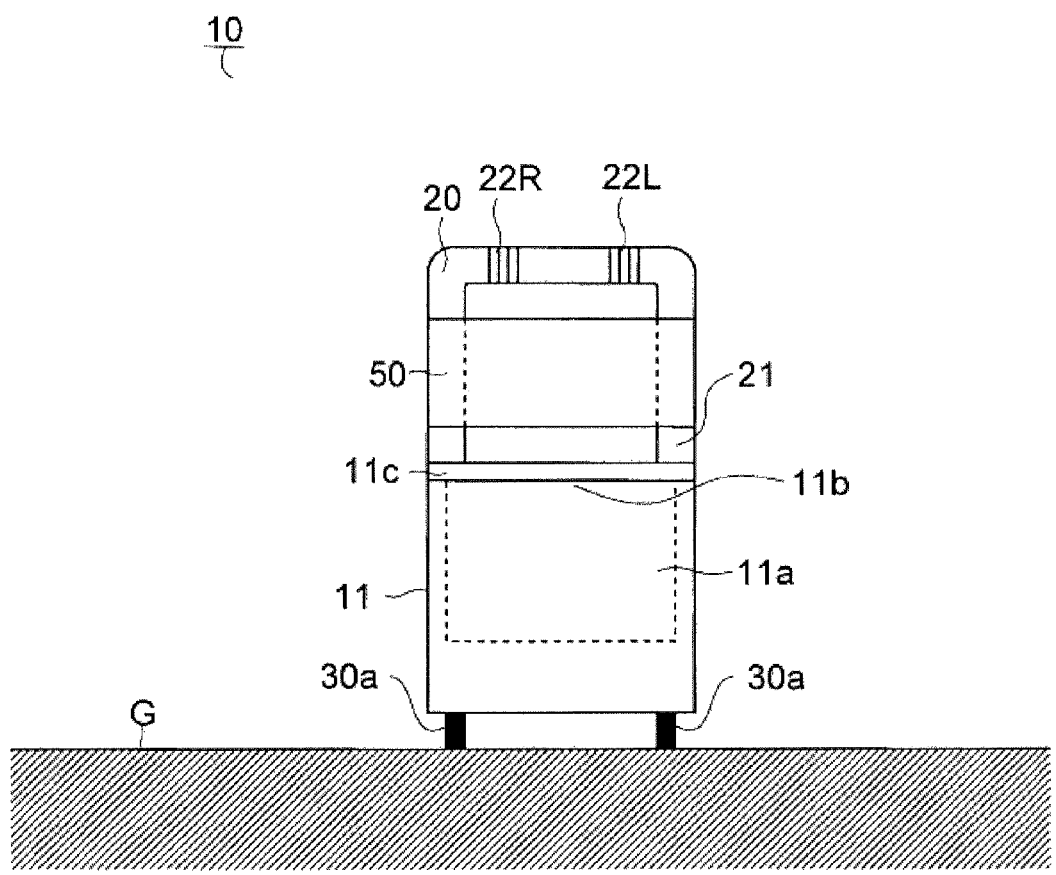
FIG. 2 is a front view illustrating a main body part of the ambulatory assist vehicle according to one or more embodiments of the first example of the present invention.

Embodiments according to the present invention will be described with reference to drawings. FIG. 1 and FIG. 2, respectively, illustrate a side view and a front view of an ambulatory assist vehicle according to one or more embodiments of the first example. The ambulatory assist vehicle 1 (manually propelled vehicle) may comprise a main body part 10 and a mounting unit 200. The mounting unit 200 may be worn by a user H on a belt or the like. The mounting unit 200 may be kept in a cloth pocket or the like of the user H. Further, the mounting unit 200 may even serve as a ring-shaped ornament such as a pendant or necklace.

The main body part 10 assists walking of the user H (for example, an aged person whose lower part of the body has declined), and also is used as a basket for loading carriage and a chair for a rest. The main body part 10 has a storage part 11, a grip part 20, and a backrest part 50.

A pair of drive wheels 30a is provided at the front bottom portion of the storage part 11. A pair of idler wheels 30b is provided at the rear bottom portion of the storage part 11. The drive wheels 30a are connected to a motor 100 (refer to FIG. 4) as described later. Further, the idler wheels 30b are composed of free wheels. When the user H grips the grip part 20 and applies a horizontal force to the main body part 10, the drive wheels 30a and the idler wheels 30b rotate around the axle shaft (not illustrated). Accordingly, the user H can move the main body part 10 forward or backward along the ground G. Furthermore, rotation speed of the left and right drive wheels 30a is controlled by the motor 100 to differ so as to allow the main body part 10 to turn.

The storage part 11 is provided with a baggage compartment 11a where an opening part 11b is opened at the upper surface. An opening part 11b is opened and closed by a lid part 11c made of a sheet-like member. Accordingly, personal belongings or the like can be stored in the baggage compartment 11a via the opening part 11a. Further, when the opening part 11b is closed by the lid part 11c, the user H can sit on the lid part 11c.

The grip part 20 is provided on the upper end part of the support part 21 extending upward from the rear end of the storage part 11. When the user H grips the grip part 20 with both hands or one hand and applies manpower, the drive wheels 30a and idler wheels 30b rotate, and the main body part 10 can be moved on the ground G. Further, a left hand grip 22L and a right hand grip 22R for slip resistance is circumferentially provided on the grip part 20. A height adjustment mechanism may be provided to the grip part 20 or the support part 21.

A backrest part 50 is composed of a sheet-like member and is attached to the support part 21. Accordingly, the user H can lean against the backrest part 50 when sitting down on the lid part 11c. A cushion or the like may be provided to the backrest part 50.

Figure 3:
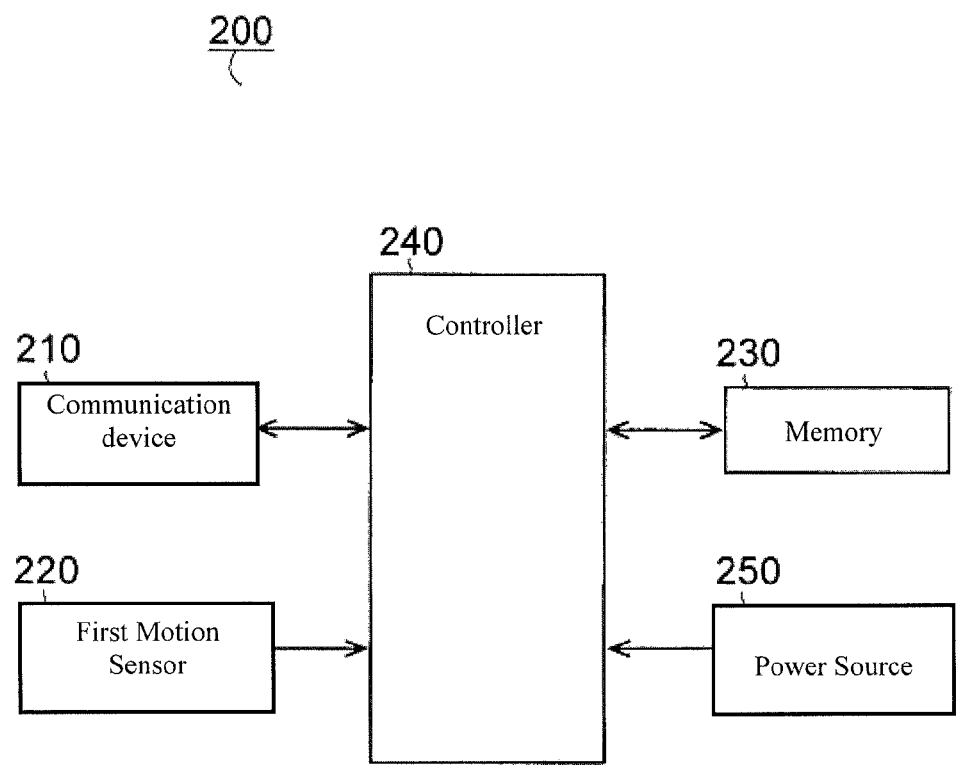
FIG. 3 is a block diagram illustrating a configuration of the mounting unit of the ambulatory assist vehicle according to one or more embodiments of the first example of the present invention.

FIG. 3 is a block diagram illustrating a configuration of a mounting unit 200. The mounting unit 200 is provided with a controller 240 composed of a CPU, and each part of the mounting unit 200 is controlled by the controller 240. A communication device 210, a first motion sensor 220, a memory 230, and a power source 250 are respectively connected to the controller 240.

The communication device 210 may carry out wireless communications with a communication device 110 (refer to FIG. 4) of the main body part 10 according to, e.g., the Bluetooth (registered trademark) standard. The power source 250 is composed of a secondary battery (for example, a lithium-ion battery, a nickel-hydrogen battery, or the like) removable from the mounting unit 200, and supplies electric power to each part of the mounting unit 200.

The first motion sensor 220 is provided with a mutually orthogonal three-direction (X, Y and Z directions in FIG. 1) acceleration sensor (so-called triaxial acceleration sensor) and a gyro sensor. The gyro sensor detects each rotation direction and speed (angler velocity) within three orthogonal planes (XY plane, YZ plane, and XZ plane).

The memory 230 is composed of, for example, an EEPROM or the like, and stores various data and a motion program of the mounting unit 200. Data stored in the memory 230 includes identification information of the mounting unit 200 and detection data of the first motion sensor 220 when the user H has walked away from the main body part 10. The identification information of the mounting unit 200 uses, for example, a MAC address or the like.

Figure 4:
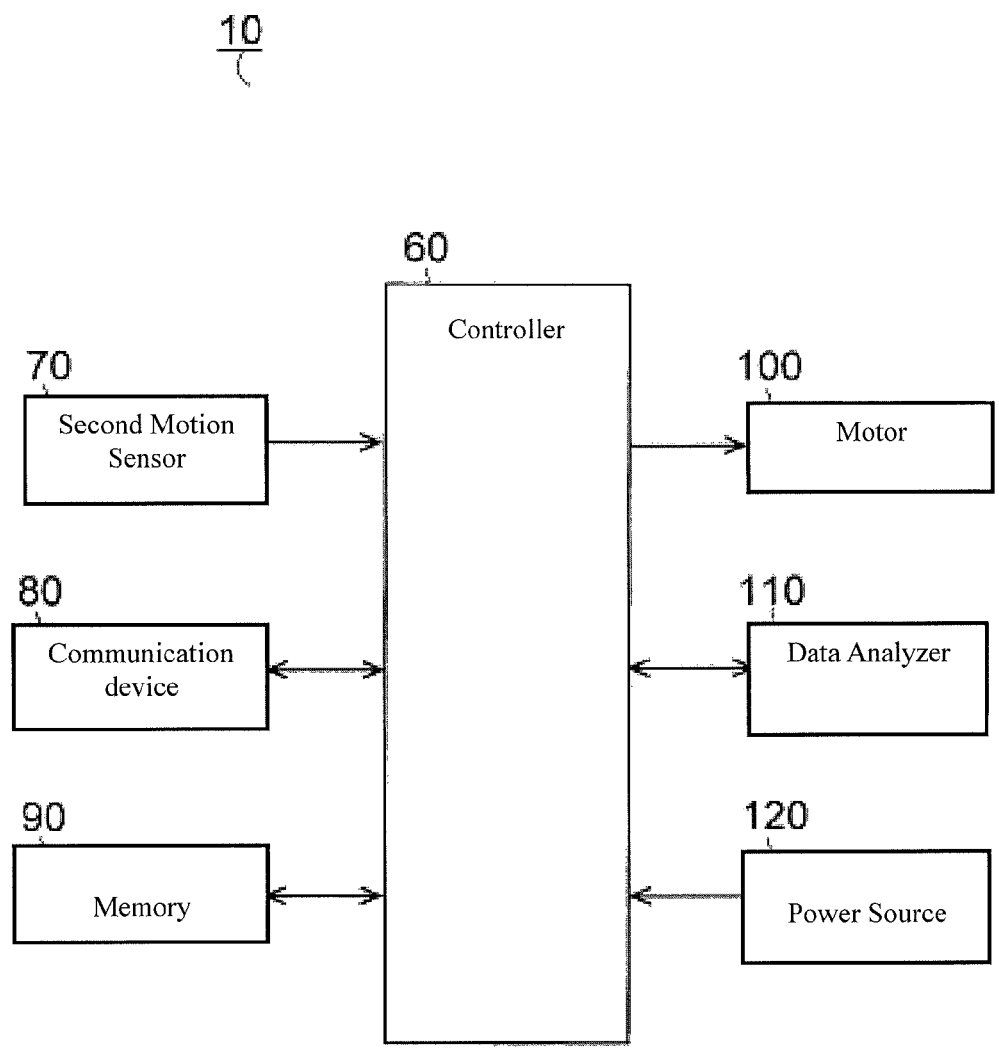
FIG. 4 is a block diagram illustrating a configuration of the main body part of the ambulatory assist vehicle according to one or more embodiments of the first example of the present invention.

FIG. 4 is a block diagram illustrating a configuration of the main body part 10 of the ambulatory assist vehicle 1. The main body part 10 is provided with a controller 60 composed of a CPU, and each part of the main body part 10 is controlled by the controller 60. A second motion sensor 70, a communication device 80, a memory 90, a motor 100, a data analyzer 110, and a power source 120 are respectively connected to the controller 60. The power source 120 is composed of a removable secondary battery (for example, a lithium-ion battery, a nickel-hydrogen battery, or the like) with respect to the main body part 10, and supplies electric power to each part of the main body part 10 of the ambulatory assist vehicle 1. The communication devices 80 and 210 may also be, for example, a radio.

The second motion sensor 70 includes a mutually orthogonal three-direction (X, Y and Z directions in FIG. 1) acceleration sensor (so-called three-axial acceleration sensor). A moving state in the horizontal direction and the vertical direction of the main body part 10 can be detected by the second motion sensor 70. Further, the second motion sensor 70 can detect, for example, when the main body part 10 is at a stop, moving on an inclined surface, or the like by detecting in the gravity direction.

The communication device 80 may carry out wireless communication with the communication device 210 of the mounting unit 200 worn by the user H according to, e.g., the Bluetooth Standard. The communication device 80 receives an inquiry signal from the communication device 210, and sends a response signal for the inquiry signal to the communication device 210. For the response signal, for example an FHS (frequency hop synchronization) packet may be used.

Further, the communication device 80 receives an establish communication request signal from the communication device 210 of the mounting unit 200. Thereby, the communication between the mounting unit 200 and the main body part 10 is established according to the Bluetooth Standard (pairing). Accordingly, the detection result of the first motion sensor 220 can be sent to the main body part 10.

The data analyzer 110 determines a walking state and wearing condition of the mounting unit 200 on the user H based on a detection result of the first motion sensor 220 sent from the mounting unit 200. Further, the data analyzer 110 carries out correction processing to correct detection data of the first motion sensor 220 by comparing the detection result of the first motion sensor 220 and the detection result of the second motion sensor 70. That a correction process will be described later.

The memory 90 is composed of, for example, an EEPROM or the like, and stores a behavior program of the ambulatory assist vehicle 1 and various data. Data stored in the memory 90 includes identification information of the mounting unit 200 that has established communication with the main body part 10, a history of the travel speed of the main body part 10, and the like.

The motor 100 assists a rotation of the drive wheels 30a based on a detection result of the acceleration sensor of the second motion sensor 70 when the main body part 10 is pushed by the user H in an advancing direction. For example, when a forward movement (left direction in FIG. 1) of the main body part 10 is detected by the acceleration sensor of the second motion sensor 70, the motor 100 applies a predetermined rotational force to the drive wheels 30a that rotate in a forward direction.

Further, when the main body part 10, for example, goes up an inclined surface, and an upward movement of the main body part 10 is detected by the acceleration sensor of the second motion sensor 70, the motor 100 applies the predetermined rotation force to the drive wheels 30a that rotate toward the advancing direction. The travel speed of the main body part 10 when the predetermined rotational force is applied to the drive wheels 30a needs to avoid becoming greater than the walking speed of the user H.

Thereby, the user H can move the main body part 10 with a small force. Therefore, a burden of the user H when walking while pushing the main body part 10 can be reduced.

Furthermore, the motor 100 stops rotation of the drive wheels 30a based on the detection result of the first motion sensor 220.

In the ambulatory assist vehicle 1 of the configuration described above, power source is introduced to the mounting unit 200 and the main body part 10 where pairing has been completed. Thereby, the detection data of the first motion sensor 220 of the mounting unit 200 is sent to the communication device 80 of the main body part 10.

The user H wears the mounting unit 200, for example, around the waist by a belt or the like in a predetermined direction. Thereby, the first motion sensor 220 detects, for example, a gravitational acceleration in the Z direction, and identifies that the vertical direction is the Z direction while the horizontal directions are the X and Y directions. If the mounting direction of the mounting unit 200 is different due to placing in a pocket or the like, the direction of the gravitational acceleration steadily applied to the mounting unit 200 is detected by the first motion sensor 220. As a result, the vertical direction and the horizontals direction are derived. In the following description, the Z direction will be designated as the vertical direction for ease in understanding.

The detection result of the first motion sensor 200 is sent to the main body part 10 via the communication device 210. Then, in the data analyzer 110 of the main body part 10, when the acceleration sensor of the first motion sensor 220 detects an acceleration in the X and Y directions, it is determined that the mounting unit 200 is moving in the front-back direction (lateral direction in FIG. 1) as well as the lateral direction (orthogonal direction on the sheet in FIG. 1) respectively. As a result, the main body part 10 can detect the movement in the horizontal direction of the mounting unit 200. For example, when the user H grips the grip part 20 and advances forward (left side in FIG. 1) by pushing the main body part 10, the mounting unit 200 detects a positive acceleration towards the advancing direction, and also detects, in the direction (lateral direction) orthogonal to the advancing direction, an acceleration generated alternately in the lateral direction according to the motion (walking motion) of the right and left legs of the user H. Thereby, the advancement of the user H is detected.

Further, in the data analyzer 110, when the acceleration sensor of the first motion sensor 220 detects an acceleration change in the Z direction, it is determined that the mounting unit 200 is moving in the up-down direction. Thereby, the main body part 10 can detect the movement in the vertical direction of the user H wearing the mounting unit 200. At that time, if the mounting unit 200 moves a shorter distance than a predetermined distance in the vertical direction, it is determined that the user H is seated on the storage part 11 or the like. If the mounting unit 200 moves a longer distance than a predetermined distance, it can also be determined that the user H is squatting down.

Furthermore, a tilt in the vertical plane or swiveling in the horizontal plane of the user H who wears the mounting unit 200 can be detected by a gyro sensor of the first motion sensor 220.

As described above, having the user H wear the mounting unit 200 and walk by pushing the main body part 10 of the ambulatory assist vehicle 1, the main body part 10 can identify a moving state of the mounting unit 200.

There may be a case where a detection result of the acceleration sensor of the first motion sensor 220 and a detection result of the acceleration sensor of the second motion sensor 70 are different due to a difference in the configurations of the main body part 10 and the mounting unit 200. That is, when the user H wears the mounting unit 200 and walks by pushing the main body part 10, there may be a case, for example, where an acceleration in the forward direction detected by the acceleration sensor of the second motion sensor 70 and the acceleration in the forward direction detected by the acceleration sensor of the first motion sensor 220 are different.

At that time, when the main body part 10 controls a drive of the motor 100 in order for the travel speed to match the walking speed of the user H based on a detection result of the first motion sensor 220, the walking speed of the user H differs from the travel speed of the main part 10. For this reason, the user H feels uncomfortable when walking.

Thereby, when the user H walks by pushing the main body part 10, a correction process that corrects detection data of the first motion sensor 220 is carried out so that the acceleration speed of the first motion sensor 220 and the second motion sensor 70 become the same. Because the main body part 10 of the ambulatory assist vehicle 1 and the user H substantially advance integrally, each of the moving distances of the user H and the main body part 10 for a certain period of time derived based on the detected data of the first motion sensor 220 after correction processing and the detected data of the second motion sensor 70 are substantially the same. The correction process is carried out at the time of production of the ambulatory assist vehicle 1; however, it is also carried out in the same manner when the mounting unit 200 that differs from the time of shipping of the ambulatory assist vehicle 1 first establishes communication with the main body part 10.

Figure 5:
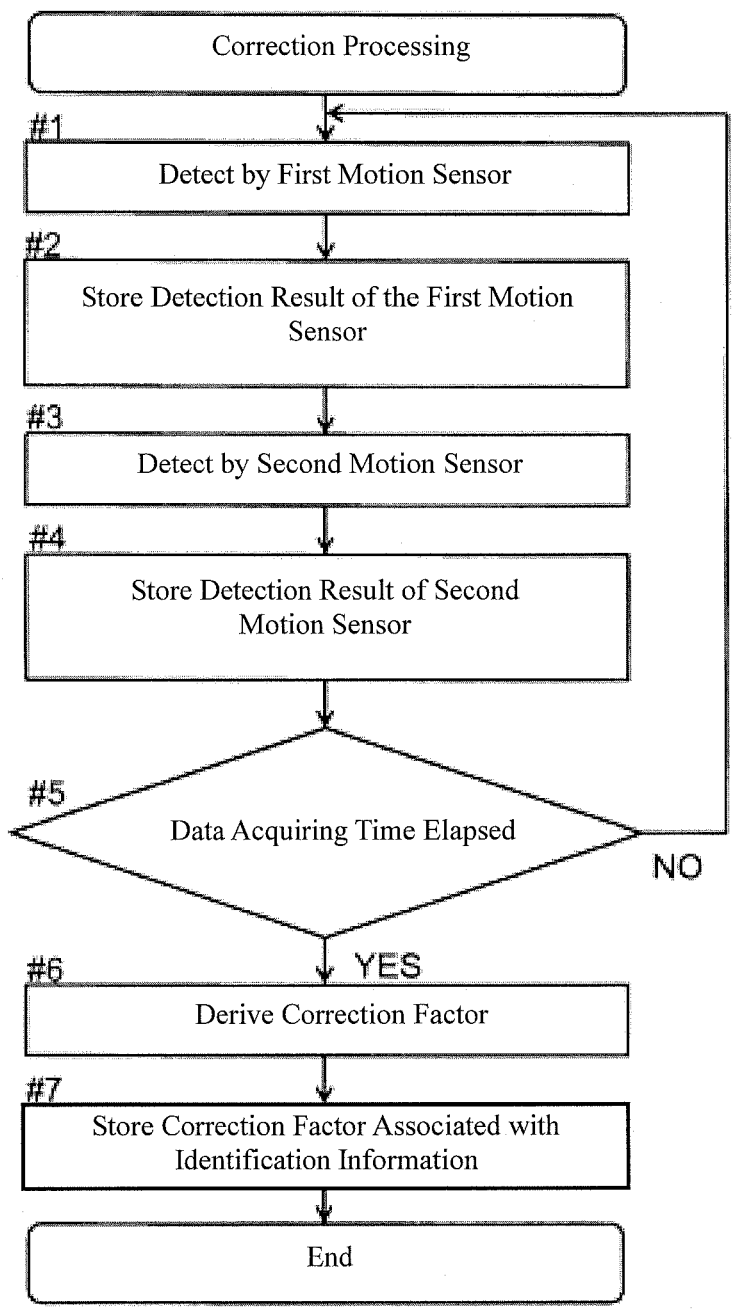
FIG. 5 is a flowchart illustrating a correction process that corrects detection data of a first motion sensor of the mounting unit of the ambulatory assist vehicle according to one or more embodiments of the first example of the present invention.

FIG. 5 is a flowchart illustrating an operation of correction processing. The correction processing is initiated at the time of production of the ambulatory assist vehicle 1 or when at the time of the first communication established between the main body part 10 and the mounting unit 200. In step 1, an acceleration a1 in the horizontal direction of the mounting unit 200 is detected by the first motion sensor 220. In step 2, the detection result of the first motion sensor 220 is stored in a memory 90.

In step 3, an acceleration a2 in the horizontal direction of the main body part 10 is detected by the second motion sensor 70. In step 4, the detection result of the second motion sensor 70 is stored in the memory 90. In step 5, it is determined whether if data acquisition period has elapsed, and when the data acquisition period has not elapsed, the steps 1 to 5 are repeated.

The data acquisition period is a time period from when the user H wearing the mounting unit 200 begins walking by pushing the main body part 10 until a periodical change when walking has continued at a substantially constant speed and accelerations a1 and a2 are each stable. As a result, the accelerations a1 and a2 are detected after the user H begins walking, and the steps 1 to 5 are repeated until the accelerations a1 and a2 change stably. When change of the accelerations a1 and a2 are stable and the data acquisition period is finished, it proceeds to step 6.

In step 6, the data analyzer 110 derives a correction factor (a2/a1) so that accelerations a1 and a2 detected by the first motion sensor 220 and the second motion sensor 70 are matched. In step 7, the correction factor is stored in the memory 90 in association with the identification information of the mounting unit 200.

The detection data of the first motion sensor 220 is corrected by the correction factor derived by the correction processing, and rotation of the drive wheels 30a is controlled.

Figure 6:
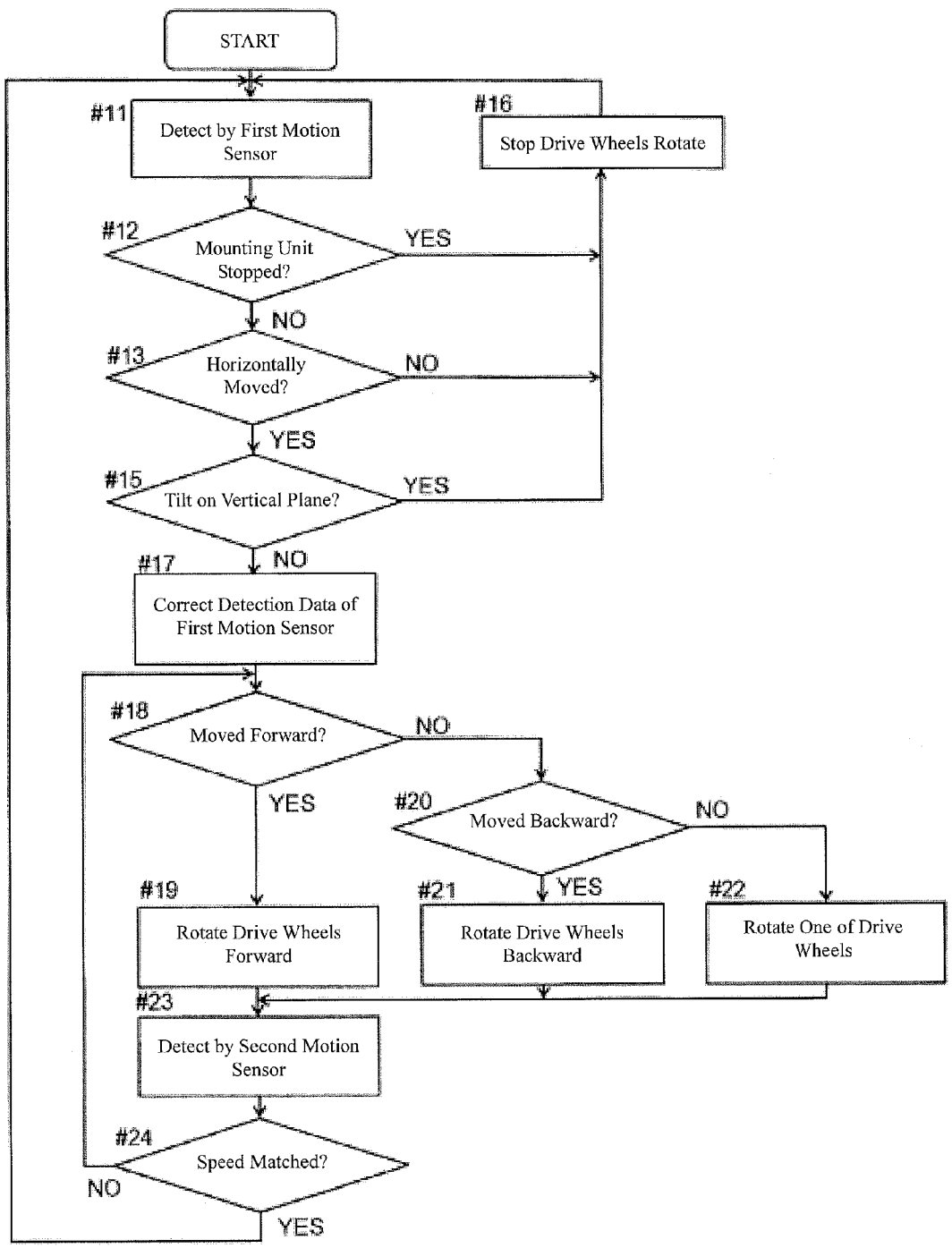
FIG. 6 is a flowchart illustrating an operation of the ambulatory assist vehicle according to one or more embodiments of the first example of the present invention.

FIG. 6 is a flowchart illustrating an operation of the ambulatory assist vehicle 1. The correction processing described above has been completed. The user H wearing the mounting unit 200 begins walking by pushing the main body part 10 in a forward direction. In step 11, a movement of the mounting unit 200 is detected by the first motion sensor 220.

In step 12, it is determined whether the mounting unit 200 has stopped. When the mounting unit 200 has stopped, it proceeds to step 16. When the mounting unit 200 has not stopped, it proceeds to step 13. In step 13, it is determined whether the mounting unit 200 has a horizontal movement. When the mounting part 200 has no horizontal movement (when having a vertical movement), it proceeds to step 16. When the mounting unit 200 has horizontal movement, it proceeds to step 15. In step 15, it is determined whether the mounting unit 200 is tilted on a vertical plane. When the mounting unit 200 is tilted on a vertical plane, it proceeds to step 16. When the mounting unit 200 is not tilted on a vertical plane, it proceeds to step 17.

In step 16, the rotation of the drive wheels 30a is stopped by the motor 100. Then, it goes back to step 11.

In step 17, the detection data of the first motion sensor 220 is multiplied by the correction factor. In step 18, it is determined whether the mounting unit 200 has moved forward. It is determined as being moved forward when there is no rotation in the horizontal plane of the mounting unit 200 and an acceleration of one side in the X direction is detected. If the mounting unit 200 has not moved forward, it proceeds to step 20. When the mounting unit 200 has moved forward, the drive wheels 30*a* rotate in the advancing direction by the motor 100 in step 19.

In step 20, it is determined whether the mounting unit 200 has moved backward. It is determined as being moved backward when there is no rotation in the horizontal plane of the mounting unit 200 and an acceleration of the other side (reverse direction of moving forward) in X direction is detected. If the mounting unit 200 has not moved backward, it proceeds to step 22. When the mounting unit 200 has moved backward, in step 21, the wheel drives 30*a* rotate in the backward direction of the main body part 10 by the motor 100.

In step 22, accelerations in the X and Y directions of the mounting unit 200 are detected, and at that time a rotation direction in the horizontal plane is detected by the gyro sensor to distinguish the right turn or the left turn. Accordingly, one side of the right and left drive wheels 30*a* is rotated to turn the main body part 10 to the right or to the left. The right and left drive wheels 30*a* may be rotated at a different rotation speed.

In step 23, an acceleration of the main body part 10 is detected by the second motion sensor 70. In step 24, it is determined whether the moving speed of the mounting unit 200 and the moving speed of the main body part 10 derived based on the accelerations detected by the first motion sensor 220 and the second sensor 70 match.

If the moving speed of the mounting unit 200 and the moving speed of the main body part 10 do not match, it goes back to step 18. As a result, the rotational force applied to the drive wheels 30*a* is varied and the drive wheels 30*a* are feedback controlled in steps 19 and 21. When the moving speed of the mounting unit 200 and the moving speed of the main body part 10 match, it goes back to step 11, and repeats steps 11 to 24.

The present example is provided with the main body part 10 that has the drive wheel 30*a* and the motor 100 that drives the drive wheel 30*a*, and assists a rotation of the drive wheels 30*a* by the motor 100 when being pushed in the advancing direction by the user, and the mounting unit 200 worn by the user H carries out communication with the main body part 10, the mounting unit 200 has the first motion sensor 220 including the acceleration sensor in three orthogonal directions, and the main body part 10 controls a drive of the motor 100 based on a detection result of the first motion sensor 220.

Because the sensor for detecting a condition of the user H is worn on the user H rather than placing it away from the user H, an acceleration sensor that is moderate in price can be used. As a result, the drive of the motor 100 can be controlled based on the condition of the user H who is pushing the main body part 10 of the ambulatory assist vehicle 1 even though the acceleration sensor with a moderate price is used. Therefore, improving usability of the ambulatory assist vehicle 1 can be achieved while also reducing the manufacturing cost of the ambulatory assist vehicle 1.

Further, the drive wheels 30*a* are driven by the motor 100 when a horizontal movement of the mounting unit 200 is detected by the first motion sensor 220, and therefore, a burden of the user who is walking by pushing the main body part 10 of the ambulatory assist vehicle 1 can be reduced.

Furthermore, the motor 100 stops the drive wheels 30*a* when a fall or stop in the horizontal movement of the mounting unit 200 is detected by the first motion sensor 220, and therefore, for example, when the user H stands still, crouches down, sits down, or the like, the rotation of the drive wheels 30*a* are stopped. This can prevent a fall or the like of the user H who is walking by pushing the main body part 10 of the ambulatory assist vehicle 1.

Moreover, the main body part 10 has the second motion sensor 70 that detects a moving state of the main body part 10, and controls a drive of the motor 100 by correcting the detection data of the first motion sensor 220 by comparing detection results of the first motion sensor 220 and the second motion sensor 70. Thereby, the travel speed of the main body part 10 and the walking speed of the user H by pushing the main body part 10 of the ambulatory assist vehicle 1 can be substantially the same. Therefore, the user H does not feel uncomfortableness when walking by pushing the main body part 10.

Also, because the first motion sensor 220 includes the gyro sensor that detects each rotation direction in three orthogonal planes, a tilt in the vertical plane and a rotation in the horizontal plane of the mounting unit 200 can be easily detected.

When a tilt in the vertical plane of the mounting unit 200 is detected by the first motion sensor 220, the drive wheels 30*a* are stopped by the motor 100 regardless of the state in the horizontal movement of the mounting unit 200. Accordingly, for example, if the user H falls over forward, the main body part 10 of the ambulatory assist vehicle 1 is stopped. Therefore, the falling user H can lean over the main body part 10, and the collision to the ground G can be prevented. As a result, the safety of the ambulatory assist vehicle 1 can be improved.

Further, because the main body part 10 stores identification information of the mounting unit 200 and the correction factor for each identification information, a moving speed (walking speed by a different user) of a different mounting unit 200 worn by a different user and the walking speed of the main body part 10 can be substantially matched.

Furthermore, the mounting unit 200 stores detection data of the first motion sensor 220 into the memory 230 when the user H has walked away from the main body part 10. Then, the mounting unit 200 sends the detection data to the main body part 10 when operating the main body part 10. Thereby, the main body part 10 can use information (for example, a walking speed or the like when the user H walks away from the main body part 10) desirable to be stored in the main body part 10 in advance before the operation. For example, when the user H begins walking by pushing the main body part 10 that has been at rest, the main body part 10 travels for a predetermined time at the travel speed that is the same as the walking speed stored in advance. Thereby, a burden of the user H at the beginning of travel of the main body part 10 can be reduced.

SECOND EXAMPLE

Next, one or more embodiments of a second example of the present invention will be described. The present example differs from the first example with respect to a point where a portable information terminal such as a mobile phone or tablet is used instead of the mounting unit 200. Other parts may be the same or substantially similar as the first example. The portable information terminal may have a three orthogonal direction acceleration sensor and a gyro sensor that detects each rotation direction in three orthogonal planes. The main body part 10 may acquire detection data of the gyro sensor and the acceleration sensor from the portable information terminal, and control a drive of the motor 100 based on the detection data.

The correction processing described above is carried out when the main body part 10 and the terminal information terminal first establishes communication.

According to one or more embodiments of the present example, this can obtain the same advantageous effect as the first example. Further, by using a common portable information terminal, general versatility of the ambulatory assist vehicle 1 can be improved.

Furthermore, in the present example, an application for the ambulatory assist vehicle 1 may be acquired by downloading, and the application may be activated to send the data of the portable information terminal to the main body part 10 of the ambulatory assist vehicle 1.

THIRD EXAMPLE

Figure 7:
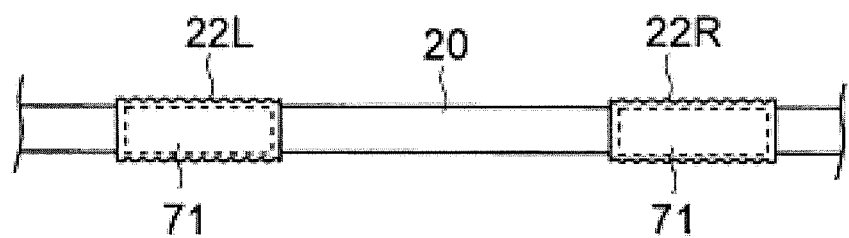
FIG. 7 is a top view of a grip part of an ambulatory assist vehicle according to one or more embodiments of a third example of the present invention.

Next, one or more embodiments of a third example of the present invention will be described. FIG. 7 illustrates a top view of a grip part 20 of an ambulatory assist vehicle 1 according to one or more embodiments of the present example. For convenience of giving a description, the same reference codes are attached to parts same or similar to those of the first example illustrated in FIGS. 1 to 6. The present example differs from the first example with respect to a point where a grip part sensor 71 that detects force applied to the grip part 20 is provided. Other parts may be the same or substantially similar as the first example.

According to one or more embodiments, the grip part sensor 71 is composed of, for example, a sheet-like pressure sensor, and is circumferentially provided at locations that are covered by the left hand grip 22L and the right hand grip 22R in the grip part 20. Thereby, the grip part sensor 71 can detect a weight in the horizontal direction and a weight in the vertical direction on the grip part 20.

Figure 8:
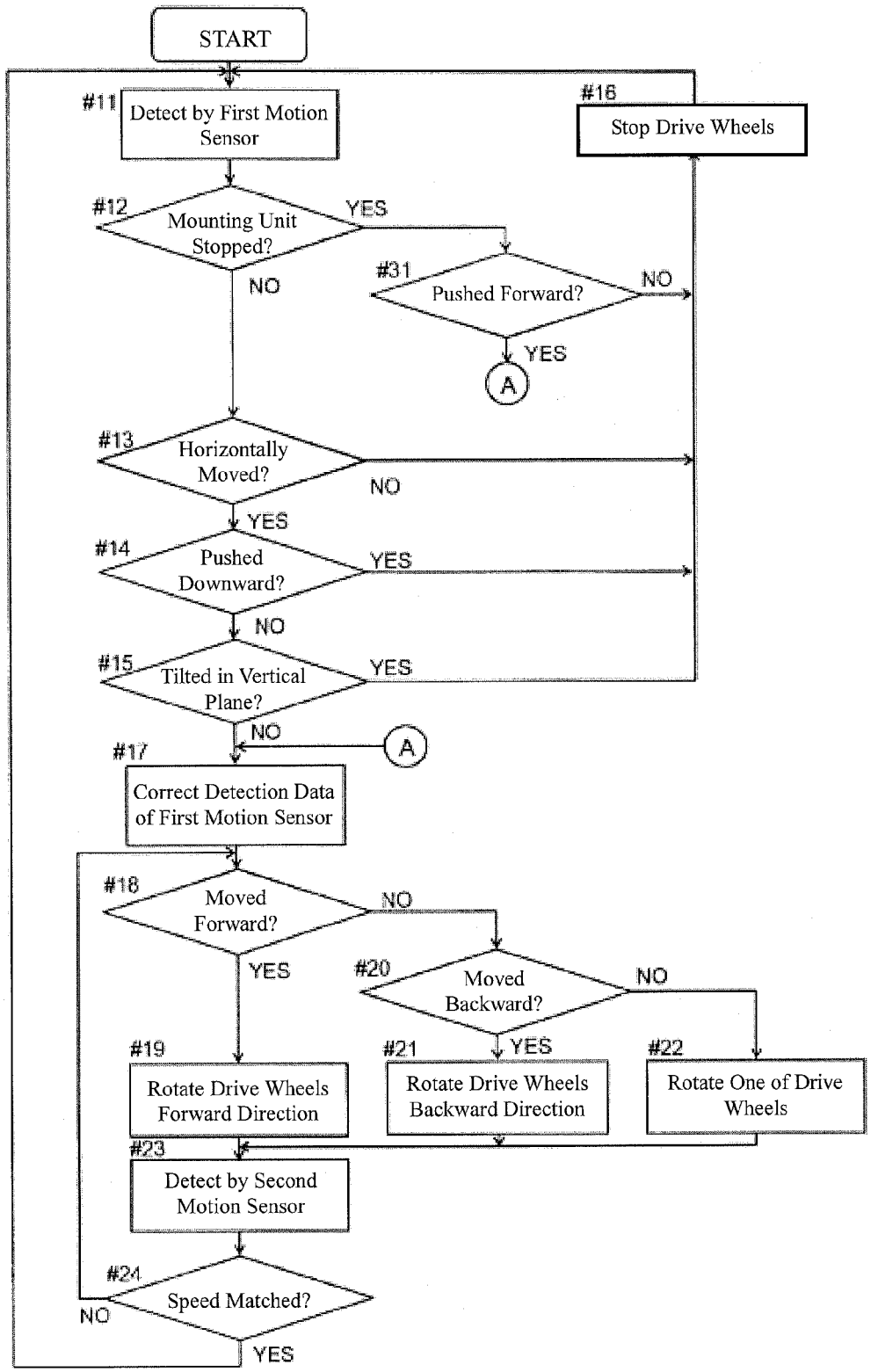
FIG. 8 is a flowchart illustrating an operation of the ambulatory assist vehicle according to one or more embodiments of the third example of the present invention.

FIG. 8 is a flowchart illustrating an operation of the ambulatory assist vehicle 1 according to one or more embodiments of the present example. The present example differs from the first example with respect to a point where step 14 and step 31 are provided. Other parts may be the same as the first example.

In step 12, when the mounting unit 200 is stopped, it proceeds to step 31. In step 31, it is determined whether the grip part 20 has been pushed forward. When the grip part 20 has not been pushed forward, it proceeds to step 16 and a rotation of the drive wheels 30a are stopped by the motor 100. Meanwhile, in step 31, when the grip part 20 has been pressed forward, it proceeds to step 17.

In step 13, when the mounting unit 200 has no horizontal movement, it proceeds to step 16, and a rotation of the drive wheels 30a is stopped by the motor 100. Meanwhile, when the mounting unit 200 has horizontal movement, it proceeds to step 14. In step 14, it is determined whether the grip part 20 has been pushed downward. When the grip 20 has not been pushed downward, it proceeds to step 15. Meanwhile, when the grip part 20 has been pushed downward, it proceeds to step 16, and a rotation of the wheel drives 30a are stopped by the motor 100.

According to the present example, this can obtain the same advantageous effect as the first example. Further, the main body part 10 has a grip part sensor 71 that detects a force applied to the grip part 20 that is gripped by the user H, and controls a drive of the motor 100 based on detection results of the first motion sensor 220 and the grip part sensor 71. Thus, the condition of the user can be more reflected in the operation of the main body part 10. Therefore, usability of the ambulatory assist vehicle 1 can be further improved.

Furthermore, the grip part sensor 71 detects a weight in the horizontal direction and a weight in the vertical direction onto the grip part 20. Thereby, the grip part sensor 71 can widely detect the force applied on the grip part 20.

Moreover, because the drive wheels 30a are driven by the motor 100 when a weight in the horizontal direction is detected by the grip part sensor 71 at the time of stopping of the drive wheels 30a, the user H can smoothly resume walking by pushing the main body part 10. Accordingly, usability of the ambulatory assist vehicle can be further improved.

Also, the drive wheels 30a are stopped by the motor 100 regardless of a state in the horizontal movement of the mounting unit 100 when a downward weight is detected by the grip part sensor 71. Thereby, when the user H who is walking by pushing the main body part 10 leans on the main body part 10 from the upward direction of the main body part 10, the main body part 10 is stopped. Therefore, a collision of the user H against the ground G can be prevented and the safety of the ambulatory assist vehicle 1 can be improved.

According to one or more embodiments of the present example, it is determined that the user H has sat down on the storage part 11 or the like when the mounting unit 200 moves a shorter distance than the predetermined distance vertically downward, and also, it is determined the user H has crouched down when the mounting unit 200 moves a longer distance than the predetermined distance. When the grip part 20 is pushed in the horizontal direction when it is determined that the user H has sat down, the main body part 10 may have horizontal movement. Accordingly, the user H can resume walking by smoothly standing up from the sitting condition.

The mounting unit 200 of the third example may be replaced with a portable information terminal of the second example.

In the first to third examples, the ambulatory assist vehicle 1 is described as an example of a manually propelled vehicle; however, it may be applied to, for example, a dolly that carries materials.

Further, in the first to third examples, the first motion sensor 220 includes the acceleration sensor and the gyro sensor; however, the gyro sensor may be omitted. Even in such case, the main body part 10 can detect horizontal movement and vertical movement of a portable information terminal, or the mounting unit 200, worn on the user H.

Furthermore, in the first and third examples, an example is described where communication according to the Bluetooth Standard is established between the main body part 10 and the mounting unit 200 or the portable information terminal; however, a wireless communication technology such as Wi-Fi standard or the like may be used instead of the Bluetooth Standard.

One or more embodiments of the present invention can be utilized in a manually propelled vehicle where a motor controls a rotation of the wheels. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF THE REFERENCE CODES 1 ambulatory assist vehicle 1 (manually propelled vehicle)
10 main body part
11 storage part
11a baggage compartment
11b opening part
11c lid part
20 grip part
21 support part
22L left hand grip 22R right hand grip
30a drive wheels
30b flexible wheel
50 backrest part
60 controller
70 second motion sensor
71 grip part sensor
80 communication device
90 memory
100 motor
110 data analyzer
120 power source
200 mounting unit
210 communication device
220 first motion sensor
230 memory
240 controller
250 power source

What is claimed is:

1. A manually propelled vehicle, comprising:
a main body part comprising a wheel and a motor; and
a mounting unit to be carried by a user and that communicates with the main body part, wherein
the mounting unit comprises a first motion sensor comprising an acceleration sensor in three orthogonal directions,
the main body part
further comprises a second motion sensor that detects a moving condition of the main body part, and
controls a drive of the motor based on a detection result of the first motion sensor and on correction data that corrects detection data of the first motion sensor by comparing detection results between the first motion sensor and the second motion sensor, and
the motor drives the wheel when the first motion sensor detects a horizontal movement of the mounting unit, and the motor stops the wheel when the first motion sensor detects falling or stopping of the horizontal movement of the mounting unit.

2. The manually propelled vehicle according to claim 1, wherein the first motion sensor further comprises a gyro sensor that detects rotation direction in at least three orthogonal planes.

3. The manually propelled vehicle according to claim 2, wherein the motor stops the wheel regardless of a condition of a horizontal movement of the mounting unit when the gyro sensor detects a tilt in a vertical plane of the mounting unit.

4. The manually propelled vehicle according to claim 1, wherein the main body part further comprises:
a grip part to be gripped by the user; and
a grip part sensor that detects force applied to the grip part and controls a drive of the motor based on a detection result of the first motion sensor and the grip part sensor.

5. The manually propelled vehicle according to claim 4, wherein the grip part sensor detects weight in a horizontal direction and weight in a vertical direction on the grip part.

6. The manually propelled vehicle according to claim 5, wherein the motor drives the wheel when the grip part sensor detects a weight in the horizontal direction while the wheel is stopped, and the motor stops the wheel regardless of a condition of a horizontal movement of the mounting unit when the grip part sensor detects a downward weight.

7. The manually propelled vehicle according to claim 1, wherein the main body part stores identification information of the mounting unit and the correction data for each of the identification information.

8. The manually propelled vehicle according to claim 1, wherein the mounting unit is a portable information terminal.

9. The manually propelled vehicle according to claim 1, wherein the mounting unit stores detection data of the first motion sensor when the user has walked away from the main body part and sends the detection data to the main body part at the time of operation of the main body part.

10. A manually propelled vehicle, comprising:
a main body part comprising a wheel and a motor, wherein
the manually propelled vehicle acquires detection data from an acceleration sensor of a portable information terminal in three orthogonal directions,
the main body part
further comprises a second motion sensor that detects a moving condition of the main body part, and
controls a drive of the motor based on the detection data and correction data that corrects the detection data by comparing detection results between the acceleration sensor and the second motion sensor, and
the motor drives the wheel when the acceleration sensor detects a horizontal movement of the portable information terminal, and the motor stops the wheel when the acceleration sensor detects falling or stopping of the horizontal movement of the portable information terminal.

11. A method for controlling a manually propelled vehicle comprising a main body part and a mounting unit to be carried by a user and that communicates with the main body part, the method comprising:
detecting a moving condition of the mounting unit using a first motion sensor;
detecting a moving condition of the main body part using a second motion sensor;
controlling a drive of a motor of the main body part based on a detection result of the first motion sensor and on correction data that corrects detection data of the first motion sensor by comparing detection results between the first motion sensor and the second motion sensor; and
driving a wheel of the main body part with the motor when the first motion sensor detects a horizontal movement of the mounting unit, and stopping the wheel when the first motion sensor detects falling or stopping of the horizontal movement of the mounting unit.

12. The method according to claim 11, further comprising detecting rotation direction of the mounting unit using a gyro sensor of the first motion sensor.

13. The method according to claim 12, further comprising stopping the wheel regardless of a condition of a horizontal movement of the mounting unit when the gyro sensor detects a tilt in a vertical plane of the mounting unit.

14. The method according to claim 11, further comprising:
detecting force applied to a grip part of the main body part using a grip part sensor; and
controlling a drive of the motor based on a detection result of the first motion sensor and the grip part sensor.

15. The method according to claim 14, further comprising detecting weight in the horizontal direction and weight in the vertical direction on the grip part.

16. The method according to claim 15, further comprising:
driving the wheel when the grip part sensor detects a weight in the horizontal direction while the wheel is stopped; and
stopping the wheel regardless of a condition of the horizontal movement of the mounting unit when the grip part sensor detects a downward weight.

17. The method according to claim 15, further comprising storing identification information of the mounting unit and the correction data for each of the identification information.

* * * * *